United States Patent [19]
Friedmann et al.

[11] Patent Number: 6,059,682
[45] Date of Patent: May 9, 2000

[54] APPARATUS FOR COOLING CLUTCHES ON A TRANSMISSION SHAFT

[75] Inventors: Oswald Friedmann, Lichtenau; Hans-Peter Fleischmann, Stammham; Thomas Suchandt, Ingolstadt; Johann Märkl, Nassenfels, all of Germany

[73] Assignee: LuK Getriebe-Systeme GmbH, Buhl, Germany

[21] Appl. No.: 09/010,368

[22] Filed: Jan. 21, 1998

[30] Foreign Application Priority Data

Jan. 31, 1997 [DE] Germany .................. 197 03 472

[51] Int. Cl.⁷ .................................................. F16H 57/04
[52] U.S. Cl. ................. 475/159; 192/113.35; 192/87.15; 192/87.17
[58] Field of Search ............... 192/113.35, 87.15, 192/70.12, 87.17

[56] References Cited

U.S. PATENT DOCUMENTS

| | | | |
|---|---|---|---|
| 3,301,367 | 1/1967 | Yokel | 192/87.14 |
| 3,823,801 | 7/1974 | Arnold | 192/87.19 |
| 3,834,503 | 9/1974 | Maurer et al. | 192/87.17 |
| 4,010,833 | 3/1977 | Brendel et al. | 192/87.15 |
| 4,905,812 | 3/1990 | Shepperd | 192/70.12 |
| 5,169,365 | 12/1992 | Friedmann | 474/18 |
| 5,667,448 | 9/1997 | Friedmann | 474/18 |

*Primary Examiner*—Charles A Marmor
*Assistant Examiner*—Tisha D. Waddell
*Attorney, Agent, or Firm*—Darby & Darby

[57] ABSTRACT

A change-speed transmission in the power train of a motor vehicle has a planetary gearing and coaxial radially inner and outer disc clutches, namely a direct clutch and a reverse clutch. At least that clutch which is engaged (i.e., in use) is cooled by a lubricant for the planetary gearing, and the flow of coolant to the clutches is regulated by the axially movable pressure plate of one of the clutches. A jet pump conveys lubricant from the sump in the transmission case into an axially extending channel of the input shaft of the transmission, and such channel forms part of a system of passages which supply coolant at least to that clutch which is then in use to transmit torque from the input shaft to an output element of the transmission.

31 Claims, 3 Drawing Sheets

APPARATUS FOR COOLING CLUTCHES ON A TRANSMISSION SHAFT

BACKGROUND OF THE INVENTION

The invention relates to transmissions in general, and more particularly to improvements in apparatus for regulating the temperatures of clutches on the shafts of transmissions for use in the power trains of motor vehicles. Still more particularly, the invention relates to improvements in transmissions which employ plural clutches, especially to transmissions which employ plural multiple-disc or multiple-plate clutches.

It is desirable to prevent overheating of disc clutches which are mounted on a shaft of a change-speed transmission in the power train of a motor vehicle. Such cooling is especially desirable or necessary if the clutches are utilized as starter clutches in a change-speed transmission, such as a CVT (continuously variable transmission). As a rule, or at least in many instances, the clutches are mounted on the input shaft of a continuously variable transmission, one of the clutches is put to use when the transmission is shifted into one of several (e.g., an infinite number of) forward gears, and another clutch is put to use when the transmission is shifted into reverse gear.

A drawback of presently utilized continuously variable transmissions of the above outlined character is that their clutches are likely to be overheated which can entail serious damage to the clutches as well as to other component parts of such transmissions. Moreover, heretofore known cooling systems are too bulky, too expensive and/or insufficiently reliable for use in passenger cars and/or other types of motor vehicles.

OBJECTS OF THE INVENTION

An object of the invention is to provide a novel and improved method of conditioning (particularly cooling) the clutches of transmissions of the type often employed in the power trains of motor vehicles, especially a method of cooling plural clutches in continuously variable transmissions of the type known as CVT.

Another object of the invention is to provide a transmission with a novel and improved system for maintaining its clutch or clutches within a temperature range which is invariably below an undesirable critical or excessive value.

A further object of the invention is to prolong the useful life of the clutches and other constituents of transmissions (especially continuously variable transmissions) in the power trains of motor vehicles.

An additional object of the invention is to provide a simple, inexpensive, compact but highly reliable cooling system for one or more clutches, such as multiple-disc or multiple-plate clutches, which are utilized in (and which can form part of) transmissions in the power trains of motor vehicles.

Still another object of the invention is to provide a transmission, such as a continuously variable transmission (CVT), which embodies a cooling system of the above outlined character.

A further object of the invention is to incorporate the above outlined cooling system into the hydraulic circuit of a continuously variable transmission for use in the power trains of motor vehicles.

Another object of the invention is to provide a power train employing a transmission which embodies the above outlined cooling or conditioning system for one or more friction clutches, especially multiple-disc or multiple-plate clutches.

SUMMARY OF THE INVENTION

The invention is embodied in an apparatus for selectively cooling coaxial first and second engageable and disengageable torque transmitting assemblies which are installed in the power train of a motor vehicle. The improved apparatus comprises a source (such as an oil sump in the case of a change-speed transmission) of coolant, first and second passages respectively connecting the source with the first and second assemblies, and means for regulating the flow of coolant from the source, through the passages and to the respective assemblies. The regulating means includes a component forming part of one of the assemblies and being movable between a first position in which the first passage establishes a path for the flow of coolant to the first assembly while the first assembly is engaged, and a second position in which the second passage establishes a path for the flow of coolant to the second assembly while the second assembly is engaged.

The arrangement is, or can be, such that the second assembly is engaged while the first assembly is disengaged and vice versa.

At least one of the assemblies can include a clutch, such as a multiple-disc clutch.

The assemblies can be mounted on a shaft (such as the input shaft) of a change-speed transmission (e.g., a continuusly variable transmission) in the power train.

As already mentioned hereinabove, at least one of the two assemblies can include a disc clutch having an axially movable pressure plate, and such pressure plate can include or constitute the aforementioned component of the regulating means. The component of or the regulating means can further comprise a diaphragm which is operatively connected with the pressure plate of the at least one disc clutch.

If the two assemblies are mounted on a shaft of a change-speed transmission, the first assembly can be disposed at a first radial distance from the axis of such shaft and the second assembly can be constructed, dimensioned and mounted in such a way that it surrounds the first assembly at a greater second radial distance from the axis of the shaft. The shaft can be provided with at least one channel (e.g., an axially extending blind bore) forming part of at least one of the first and second passages, and such shaft can be further provided with at least one outlet (e.g., in the form of a substantially radially extending port) which communicates with the at least one channel and forms part of the at least one passage. When the aforementioned component of the regulating means assumes its first position, the diaphragm permits the flow of coolant between the at least one channel and the assembly which is to receive coolant by way of the at least one passage, and the diaphragm seals the at least one passage in the second position of the component. Such regulating means can further comprise two stationary guides forming part of a valve which further includes the diaphragm and respectively directs coolant from the source to the first and second assemblies in the corresponding positions of the component.

The transmission which includes the first and second assemblies can further include a valve chest and a conduit for pressurized fluid coolant leading from the valve chest to the at least one channel in the shaft of the transmission. Still further, the case of such transmission can contain a pump (such as a jet pump) which serves to direct coolant from the sump into the conduit, i.e., into the at least one channel provided in the shaft of the transmission.

The coolant is or can constitute a lubricant (oil). If the transmission is of the type having a planetary gearing between its input and output parts, such planetary gearing can be arranged to receive lubricant from the source in at least one position of the mobile component of the regulating means.

The diaphragm of the regulating means is or can be deformable and can include an annular portion which is biased against the mobile component of the regulating means by suitable energy storing means, e.g., a diaphragm spring. Still further, the regulating means can include a ring (such as a circumferentially complete ring or a split ring) which is interposed between the diaphragm and the energy storing means. The component of the regulating means can include an extension having a first side facing away from the common axis of the two assemblies and a second side facing such axis; the aforementioned ring is adjacent the first side of the extension. The diaphragm can at least partially surround the ring.

If the regulating means comprises at least one stationary guide forming part of a valve which further includes the diaphragm, the diaphragm shares the movements of the mobile component of the regulating means and abuts the at least one guide in one position of the component. The guide of the regulating means can be biased in the axial direction of the input shaft of the transmission by an energy storing element of one of the two assemblies; such energy storing element can sealingly engage the guide and the latter is or can be resilient so that it can undergo at least some elastic deformation in order to compensate for differences between the extent of movement of the mobile component and another (stationary or mobile) component of the transmission or the regulating means.

The regulating means can be designed in such a way that it causes or permits (i.e., effects) the flow of some coolant through the second assembly while the first assembly is engaged (and/or vice versa). For example, the first assembly can include a direct clutch and the second assembly can constitute a reverse clutch of an automated transmission in the power train of a motor vehicle.

As already mentioned hereinabove, the regulating means can further comprise an energy storing element (such as an annular energy storing element in the form of a diaphragm spring which tends to disengage one of the first and second assemblies) having a radially inner portion and a radially outer portion. The radially inner and outer portions are disposed at different radial distances from the axis of the input shaft of the transmission, and such regulating means further comprises a ring which is adjacent one of the radialy inner and radially outer portions or a discrete ring adjacent each of these portions. Each such ring can constitute a circumferentially complete annulus or it can constitute a split ring.

The novel features which are considered as characteristic of the invention are set forth in particular in the appended claims. The improved transmission and the improved apparatus themselves, however, both as to their construction and their modes of operation, together with numerous additional important and advantageous features thereof, will be best understood upon perusal of the following detailed description of certain presently preferred specific embodiments with reference to the accompanying drawings.

DESCRIPTION OF PREFERRED EMBODIMENTS

Figure 1:
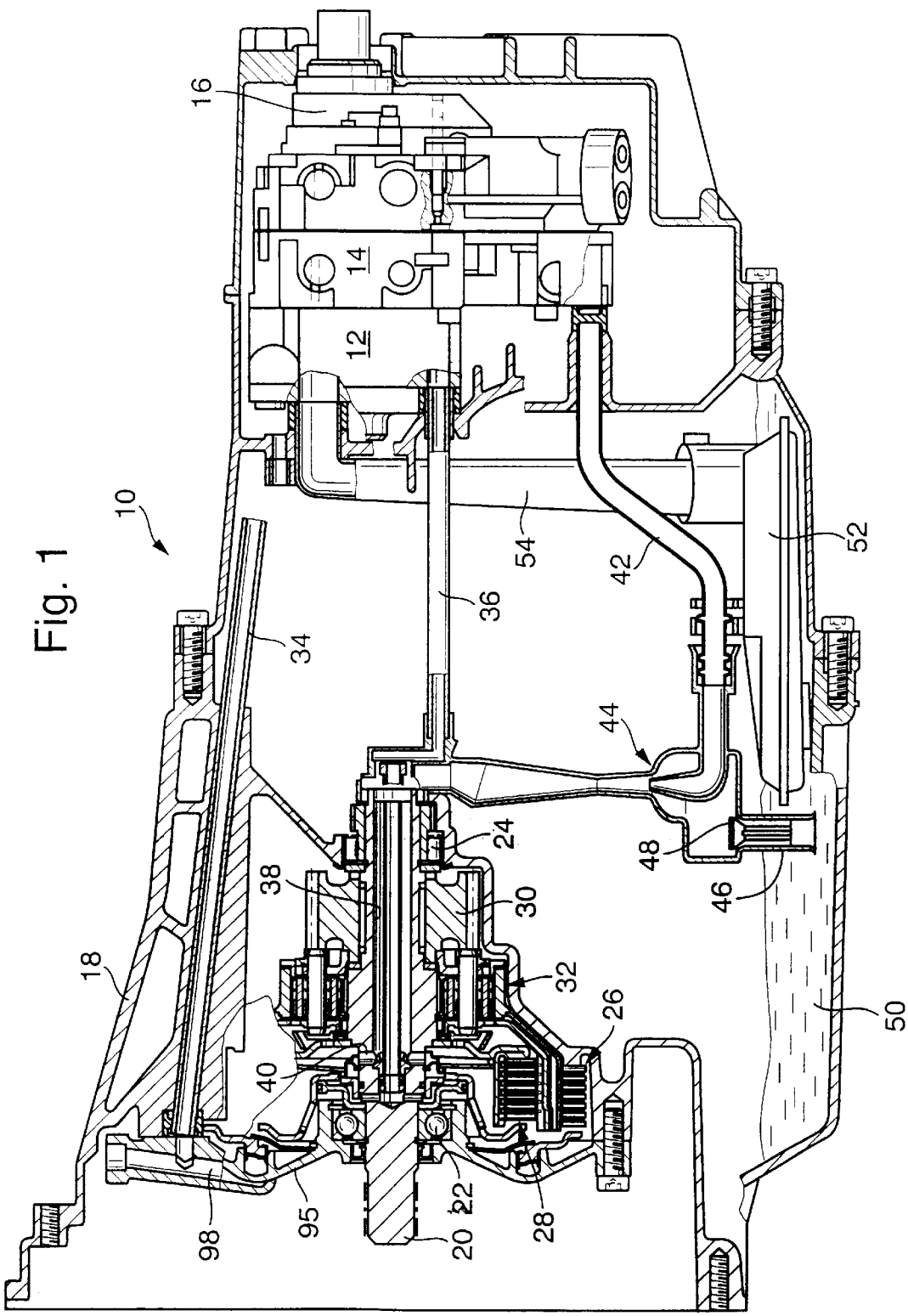
FIG. 1 is a partly elevational and partly central longitudinal sectional view of a tranmission with two multiple-disc or multiple-plate clutches which are cooled by a system embodying one presently preferred form of the invention.
Figure 3:
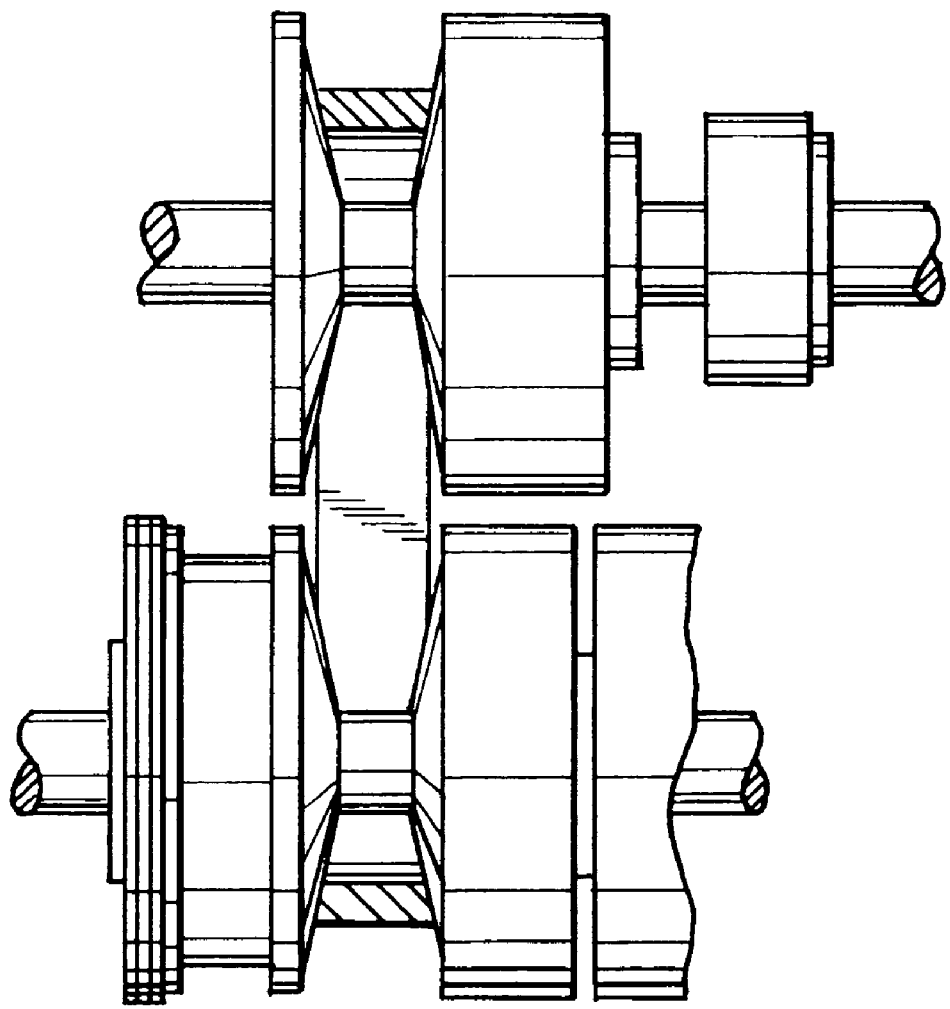
FIG. 3 is a schematic of a continually variable transmission according to an embodiment of the present invention.

FIG. 1 shows a change-speed transmission 10 (e.g., a CVT=continuously variable transmission) which is installed in the power train of a motor vehicle. The transmission 10 can be shifted (manually or automatically) into any one of several forward gears and at least one reverse gear. The illustrated transmission 10 is an automatic transmission with combined electronic and hydraulic controls including, essentially, a hydraulic pump 12, a valve chest 14 and an electronic unit 16 which is carried by the valve chest 14. For example, the transmission 10 can constitute a continuously variable transmission of the type employing adjustable pulleys or sheaves and an endless flexible torque transmitting element which is trained over the pulleys as in FIG. 3. Such transmissions are described, for example, in commonly owned U.S. Pat. No. 5,169,365 granted Dec. 8, 1992 to Oswald Friedmann for "POWER TRAIN". The disclosure of this patent is incorporated herein by reference.

The transmission 10 further comprises a case 18 including a section which surrounds a planetary gearing 32 (hereinafter called planetary for short) on an input shaft 20 which can receive torque from the prime mover (such as an internal combustion engine of the motor vehicle), e.g., by way of a suitable friction clutch, not shown. The input shaft 20 is rotatable in antifriction ball and/or roller and/or needle bearings 22, 24 and is surrounded by two coaxial engageable and disengageable torque transmitting assemblies 26, 28. The assembly 28 is located within the assembly 26 and is shown in the form of a multiple-disc or multiple-plate direct clutch which is engaged when the motor vehicle is to advance in a forward direction. The assembly 26 is a multiple-disc or multiple-plate reverse clutch which is engaged when the transmission 10 is in reverse gear. Reference may be had to the aforementioned patent to Friedmann which discloses a transmission receiving torque from an engine and including two coaxial clutches between the second pulley and the output shaft which latter can transmit torque to the driven wheels by way of a differential and live axles.

The output element of the transmission 10 includes a gear 30 which can be driven forwardly when the clutch 28 is engaged or rewardly when the clutch 26 is engaged. The arrangement can be such that the input shaft 20 drives the gear 30 forwardly by way of the clutch 28 and the planetary 32 (e.g., at a ratio of one-to-one) or in the opposite direction (rearwardly) by way of the clutch 26 and the planetary 32.

The clutches 26, 28 are operated by a pressurized hydraulic fluid (such as oil or another suitable lubricant for the gears of the planetary 32). To this end, the clutch 28 can receive pressurized fluid from the valve chest 14 by way of a first conduit 36, or the clutch 26 can receive pressurized hydraulic fluid (again from the valve chest 14) by way of a second conduit 34.

In accordance with a feature of the invention, that one of the clutches 26, 28 which is engaged is cooled by the lubricant (oil) for the planetary 32 by way of the respective one of two composite passages including a common channel 38 in the form of an axially extending blind bore in the input shaft 20. Each of the two passages further comprises at least one radial output channel or port 40 provided in the shaft 20 and serving to connect the axially extending channel 38 with the then engaged clutch 26 or 28. The channel 38 can receive pressurized coolant (lubricant) from the valve chest 14 via conduit 42 carrying an integrated jet pump 44. In addition to conveying coolant from the valve chest 14 to the channel 38 via conduit 42, the pump 44 serves to draw coolant from the sump 50 in the case 18, through a suction pipe 46 and a check valve 48, i.e., the channel 38 can receive coolant from the pump 12 via valve chest 14, conduit 42 and jet pump 44, as well as from the sump 50 via pipe 46, check valve 48 and pump 44.

The pump 12 also draws coolant from the main source (including the sump 50), namely through an oil filter 52 and a suction pipe 54.

Figure 2:
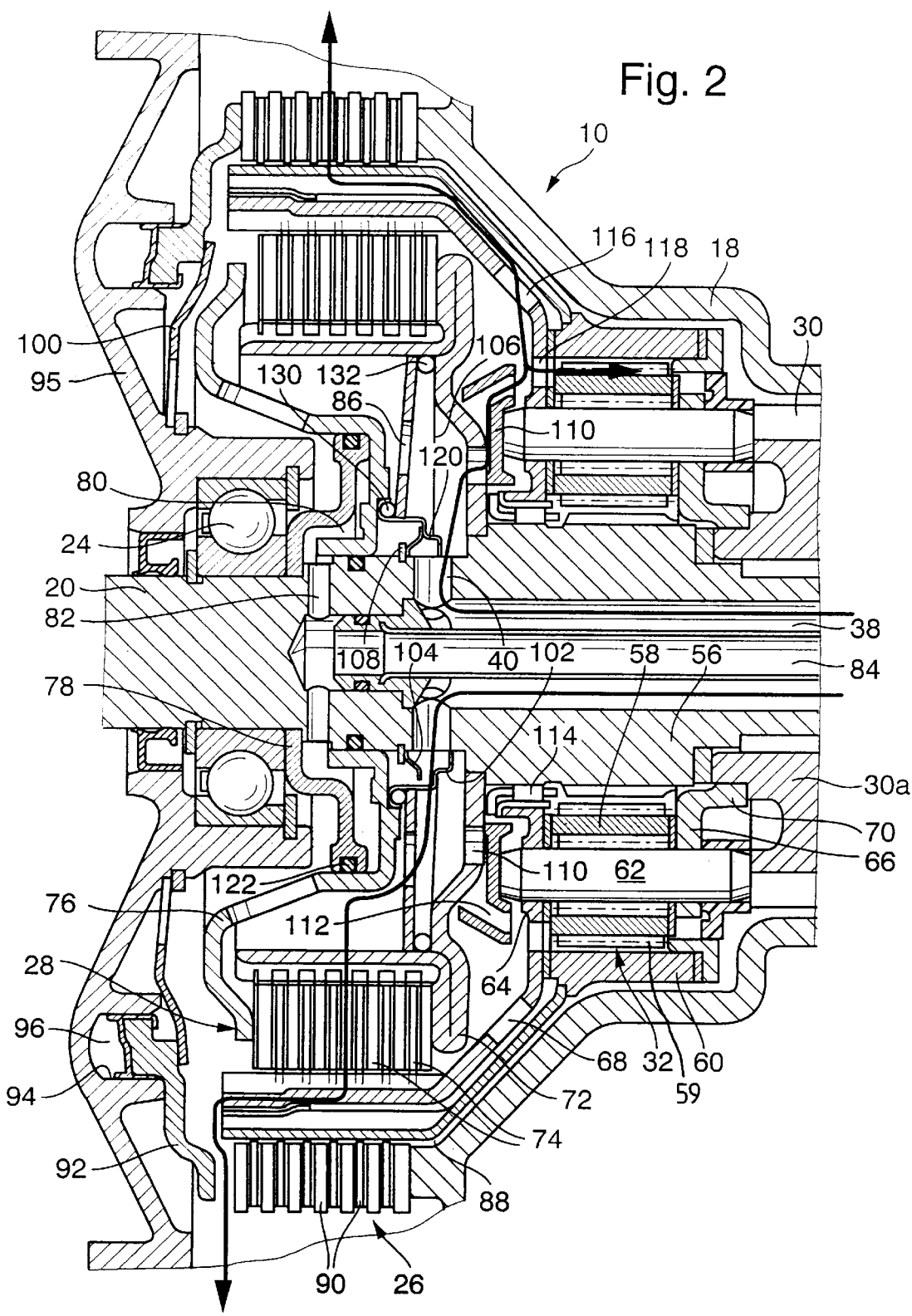
FIG. 2 is an enlarged view of a detail in the left-hand portion of FIG. 1 and shows the planetary and the two clutches of the transmission, the upper half of FIG. 2 illustrating the cooling system during cooling of one of the clutches and the lower half of FIG. 2 showing the cooling system during cooling of the other clutch.

The means for regulating the flow of coolant to the clutches 26, 28 and to the planetary 32 is shown in detail in FIG. 2. The planetary 32 comprises a sun wheel or sun gear 56 which is coaxial with and receives torque from the input shaft 20, and three sets of equidistant twin planet pinions; each such set includes a first planet pinion 58 which mates with the sun gear 56, and a second planet pinion 59 which mates with the respective pinion 58 as well as with an internal gear 60 of the planetary 32. The pins or shafts 62 of the planet pinions 58, 59 are mounted in the two-piece planet carrier 64, 66. The section 64 of the planet carrier 64, 66 mounts or is of one piece with the outer disc supporting member 68 of the clutch 28, and the section 66 of the planet carrier is of one piece with or mounts a gear 70. This gear 70 is non-rotatably secured to the hub 30a of the gear 30.

The sun gear 56 is non-rotatably secured to a hub 72 which carries the second set of discs or laminae 74 forming part of the clutch 28 and alternating with the discs on the supporting member 68.

The input shaft 20 of the transmission 10 further supports an axially movable pressure plate 76 which urges the discs 74 of the supporting member 68 and hub 72 against each other when the clutch 28 is engaged. The pressure plate 76 can be said to constitute a mobile component of the clutch 28 and also a piston serving to effect an engagement of the clutch 28 when a plenum chamber 80 defined by the pressure plate 76 with an annular housing 78 (affixed to the input shaft 20) receives pressurized fluid from the valve chest 14. The plenum chamber 80 is connected with the conduit 36 by channels 82, 84 which are machined into or otherwise formed in the shaft 20. An energy storing element in the form of a diaphragm spring 86 is provided to disengage the clutch 28 when the pressure of hydraulic fluid in the chamber 80 drops below a threshold value.

When the clutch 28 is engaged, the planet carrier 64, 66 is in frictional engagement with the sun gear 56, i.e., the shaft 20 drives the gear 30 in the same direction to move the motor vehicle forwardly at a speed determined by the selected forward ratio of the transmission 10.

The internal gear 60 of the planetary 32 carries a supporting member 88 for one set of clutch discs or laminae forming part of the clutch 26. The other set of clutch discs 90 is non-rotatably but axially movably supported by the transmission case 18. The clutch 26 further comprises an axially movable pressure plate 92 which extends into an annular recess 94 provided in the front cover 95 of the transmission case 18. The parts 92, 95 define an annular plenum chamber 96 which can receive pressurized fluid from the channel 34 by way of a radial channel 98 (shown in FIG. 1).

When the clutch 26 is engaged, the internal gear 60 of the planetary 32 is held against rotation because all of the discs or laminae 90 are then affixed to the transmission case 18. Consequently, the output gear 30 is driven at the ratio of one-to-one but in a direction counter to that of rotation of the input shaft 20. In other words, the vehicle is driven in reverse. A diaphragm spring 100 is provided to disengage the clutch 26 when the pressure of fluid in the chamber 95 drops below a threshold value.

The pressure plate 76 of the clutch 28 carries or cooperates with a ring-shaped diaphragm 102 which is held in a predetermined position relative to the pressure plate 76 under the bias of the diaphragm spring 86.

The diaphragm 102 is a circular ring and one of its axial end portions partially surrounds a ring-shaped supporting member 130. The latter can constitute a circumferentially complete annular body or a split ring and is biased by the diaphragm spring 86 in the axial direction of the input shaft 20 so that it is urged against the adjacent axial end portion of the diaphragm 102. This diaphragm is a part of the coolant flow regulating means and further serves as a means for centering the supporting ring 130 in that it includes a portion which surrounds (i.e., is located radially outwardly of) the ring 130; such portion of the diaphragm 102 is confined in an annular socket at the adjacent (right-hand) side of the axially movable pressure plate 76.

The diaphragm spring 86 includes a radially outer portion which is remote from the radially inner portion and ring 130 and bears against a second supporting member (split ring or circumferentially complete annular body) 132 which is biased against the hub 72 of the clutch 28.

Each (or at least one) of the supporting members 130, 132 can constitute a split ring or a circumferentially complete annular body.

The diaphragm 102 cooperates with two annular sheet metal guides 104, 106 to form therewith a valve. The guide 104 is affixed to the input shaft 20 by a ring-shaped resilient element 108, and the guide 106 is urged against the hub 72 of the clutch 28 by the diaphragm spring 86.

When the clutch 28 is disengaged, but the clutch 26 is engaged (refer to the upper half of FIG. 2), the transmission 10 serves to drive the motor vehicle in reverse, the stepped diaphragm 102 abuts the guide 104 and thus permits coolant to flow from the channel 38, through at least one channel 40 and into and through the clutch 26 to cool the discs 90. These discs have channels for the flow of coolant radially outwardly. The coolant flows in a manner as indicated by heavy-line arrows, namely along the sheet-metal guide 104, along the guide 106, through at least one opening 110 of the hub 72, through one or more openings 112 in a ring-shaped guide 114, and thereupon through one or more openings 116 in the supporting member 68 on to the discs 90 of the clutch 26 and radially outwardly back to the sump 50.

The ring-shaped guide 114 serves as an axial stop for the shafts 62 of the planet pinions 58, 59 as well as to deflect a portion of coolant through openings 118 in the planet carrier section 64 into the planetary 32 so that the thus deflected coolant serves to lubricate the constituents of the planetary.

When the clutch 26 is disengaged but the clutch 28 is engaged, the flow of coolant takes place in a manner as shown by heavy-line arrows in the lower half of FIG. 2. At such time, the diaphragm 102 is shifted to the right, as viewed in FIG. 2, by the pressure plate 76 in order to ensure that the diaphragm engages the guide 106 and to thus guarantee that streams of coolant can flow through one or more openings or windows 120 of the diaphragm 102, along the opposite side of the guide 106, through one or more cutouts 122 provided in the diaphragm spring 86, and to the engaged clutch 28. The coolant flows radially outwardly through the clutch 28 (and more specifically through suitable radially extending grooves or channels in the discs 74) and back to the sump 50.

It will be seen that the cooling of the clutches 26 and 28 is directly dependent upon the axial position of the component (pressure plate) 76 of the clutch 28 and on the axial position of the diaphragm 102 which moves with the pressure plate 76.

In accordance with an additional feature of the invention, a certain amount of coolant can be caused to flow through the (disengaged) clutch 26 while the clutch 28 is engaged, i.e., when the input shaft 20 and the gear 30 of the transmission 10 rotate in the same direction (forward movement of the motor vehicle). Analogously, at least some (i.e., less than maximal) cooling of the (disengaged) clutch 28 can take place while the clutch 26 is engaged to drive the motor vehicle in reverse.

An advantage of the feature that a component (76) of one (such as 28) of the two clutches serves to direct coolant to the momentarily engaged clutch 26 or 28 is that one can dispense with additional valves, such as electromagnetic valves, as well as that the cooling system is more reliable because it employs a small number of relatively simple parts which are necessary anyway since they perform important functions in addition to that of ensuring adequate cooling of the engaged clutch and preferably also of the other (disengaged) clutch.

The diaphragm 102 constitutes a very simple, compact and inexpensive part of the coolant flow regulating means which latter further includes the pressure plate 76 and the guides 104, 106. As already mentioned hereinbefore, the diaphragm 102 and the stationary guides 104, 106 can be said to constitute a valve which reacts to axial movements of the pressure plate 76 to divert coolant into the clutches 26 and 28 or, at the very least, into that clutch which is in the process of transmitting torque from the shaft 20 to the gear 30.

An advantage of the jet pump 44 is that it ensures the circulation of coolant at a rate which is sufficiently high to guarantee adequate cooling of the clutch 26 (preferably with at least some cooling of the clutch 28) or vice versa. In addition, the utilization of a jet pump or an equivalent pump for drawing coolant from the sump 50 via conduits 42 and 46 renders it possible to employ a smaller-capacity pump 12 (i.e., a pump whose space and energy requirements are reduced accordingly). Moreover, the jet pump 44 need not comprise any moving parts; this is in contrast to the construction of pumps which are utilized in conventional transmissions as a means for conveying a suitable coolant to one or more torque transmitting assemblies in the case of a manually shiftable or automated transmission in the power train of a motor vehicle.

The optional but highly desirable and advantageous feature that the component 76 and the associated diaphragm 102 can serve the additional purpose of adequately lubricating the planetary 32 further contributes to a pronounced simplification, greater compactness and to versatility of the improved cooling apparatus. For example, the lubricating procedure can be carried out in such a way that the gears and the pinions of the planetary 32 are lubricated at least while they are caused to rotate but need not be lubricated (or need not be lubricated to the same extent) when such gears and pinions are held against rotation. Thus, the planetary 32 can be lubricated when the clutch 28 is engaged but need not always be lubricated when the clutch 26 is engaged, i.e., when the planet carrier 60 does not rotate with the shaft 20.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of systems for cooling the clutches of transmissions for use in the power trains of motor vehicles and, therefore, such adaptations should and are intended to be comprehended within the meaning and range of equivalence of the appended claims.

What is claimed is:

1. Apparatus for selectively cooling coaxial first and second engageable and disengageable torque transmitting asemblies which are installed in the power train of a motor vehicle, comprising a source of fluid coolant, first and second passages respectively connecting said source with said first and second assemblies; and means for regulating the flow of coolant from said source, through said passages and to the respective assemblies, including a component forming part of one of said assemblies and being movable between a first position in which said first passage establishes a path for the flow of coolant to said first assembly while said first assembly is engaged and a second position in which said second passage establishes a path for the flow of coolant to said second assmbly while said second assembly is engaged, said one assembly including a disc clutch having a pressure plate and said component of said regulating means including said pressure plate.

2. The apparatus of claim 1, wherein said second assembly is engaged while said first assembly is disengaged and vice versa.

3. The apparatus of claim 1, wherein said assemblies are mounted on a shaft of a change-speed transmission in said power train.

4. The apparatus of claim 3, wherein said transmission is a continuously variable transmission.

5. The apparatus of claim 1, wherein said regulating means further comprises a diaphragm operatively connected with said pressure plate.

6. The apparatus of claim 1, wherein said assemblies are mounted on a shaft of a change-speed transmission, said first assembly being disposed at a first radial distance from an axis of said shaft and said second assembly surrounding said first assembly at a greater second radial distance from said axis, said shaft having at least one channel forming part of at least one of said passages and said shaft further having at least one outlet communicating with said at least one channel and forming part of said at least one passage, said regulating means further comprising a diaphragm which, in said first and second positions of said component, respectively permits and prevents the flow of coolant between said at least one channel and the assembly which is arranged to receive coolant by way of said at least one passage.

7. The apparatus of claim 6, wherein said regulating means further comprises two stationary guides forming part of a valve which further includes said diaphragm and respectively directs coolant from said source to said first and second assemblies in the corresponding positions of sid component.

8. The apparatus of claim 1, wherein said assemblies form part of a fluid-operated change-speed transmission and said transmission further comprises a valve chest, a shaft surrounded by said assemblies and having a channel forming part of at least one of said passages, a conduit for pressurized fluid coolant connecting said valve chest with said channel, a sump forming part of said source, and a pump for directing coolant from said sump into said conduit.

9. The apparatus of claim 8, wherein said pump is a jet pump.

10. The apparatus of claim 1, wherein said coolant is a lubricant and said assemblies are mounted on a shaft of a change-speed transmission which further comprises a planetary, said planetary being arranged to receive lubricant from said source in at least one position of said component.

11. The apparatus of claim 1, wherein said regulating means further comprises a deformable diaphragm having an annular portion, and energy storing means arranged to bias said annular portion against said component.

12. The apparatus of claim 1, wherein said assemblies surround a shaft forming part of a change-speed transmission defining a common axis for said assemblies, said regulating means further comprising at least one guide and a diaphragm which is movable with said component and engages said guide in one position of said component, one of said assemblies including an energy storing element which biases said guide in the axial direction of said shaft.

13. The apparatus of claim 1, wherein said regulating means is operative to effect the flow of some coolant through said second assembly while said first assembly is engaged.

14. The apparatus of claim 13, wherein said first assembly includes a direct clutch and said second assembly includes a reverse clutch of a transmission in said power train.

15. The apparatus of claim 1, wherein said regulating means further comprises an annular energy storing element coaxial with said assemblies and including a radially inner portion nearer to and a radially outer portion more distant from the common axis of said assemblies, and a ring abutting at least one of said radially inner and outer portions.

16. Apparatus for selectively cooling coaxial first and second engageable and disengageable torque transmitting assemblies which are installed in the power train of a motor vehicle, comprising a source of fluid coolant, first and second passages respectively connecting said source with said first and second assemblies; and means for regulating the flow of coolant from said source, through said passages and to the respective assemblies, including a component forming part of one of said assemblies and being movable between a first position in which said first passage establishes a path for the flow of coolant to said first assembly while said first assembly is engaged and a second position in which said second passage establishes a path for the flow of coolant to said second assembly while said second assembly is engaged, said regulating means further comprising a deformable diaphragm having an annular portion, and energy storing means arranged to bias said annular portion against said component.

17. The apparatus of claim 16, wherein at least one of said assemblies includes a disc clutch.

18. The apparatus of claim 16, wherein said one assembly includes a disc clutch having a pressure plate and said component of said regulating means includes said pressure plate.

19. The apparatus of claim 16, wherein said regulating means further comprises a ring interposed between said energy storing means and said diaphragm.

20. The apparatus of claim 19, wherein said ring is a split ring.

21. The apparatus of claim 19, wherein said ring includes a circumferentially complete annulus.

22. The apparatus of claim 19, wherein said component includes an extension having a first side facing away from the common axis of said assemblies and a second side facing said axis, said ring being adjacent said first side of said extension.

23. The apparatus of claim 19, wherein said diaphragm at least partialy surrounds said ring.

24. The apparatus of claim 16, wherein said regulating means further comprises at least one stationary guide forming part of a valve which further includes said diaphragm, said diaphragm being movable with said component and abutting said at least one guide in one position of said component.

25. Apparatus for selectively cooling coaxial first and second engageable and disengageable torque transmitting assemblies which are installed in the power train of a motor vehicle, comprising a source of fluid coolant, first and second passages respectively connecting said source with said first and second assemblies; and means for regulating the flow of coolant from said source, through said passages and to the respective assemblies, including a component forming part of one of said assemblies and being movable between a first position in which said first passage establishes a path for the flow of coolant to said first assembly while said first assembly is engaged and a second position in which said second passage establishes a path for the flow of coolant to said second assembly while said second assembly is engaged, said assemblies surrounding a shaft forming part of a change-speed transmission defining a common axis for said assemblies and said regulating means further comprising at least one guide and a diaphragm which is movable with said component and engages said guide in one position of said component, one of said assemblies including an energy storing element which biases said guide in the axial direction of said shaft.

26. The apparatus of claim 25, wherein said energy storing element sealingly engages said guide.

27. The apparatus of claim 25, wherein said guide is resilient and is arranged to undergo elastic deformation to compensate for differences between the extents of movement of said component and another component.

28. Apparatus for selectively cooling coaxial first and second engageable and disengageable torque transmitting assemblies which are installed in the power train of a motor vehicle, comprising a source of fluid coolant, first and second passages respectively connecting said source with said first and second assemblies; and means for regulating the flow of coolant from said source, through said passages and to the respective assemblies, including a component forming part of one of said assemblies and being movable between a first position in which said first passage establishes a path for the flow of coolant to said first assembly while said first assembly is engaged and a second position in which said second passage establishes a path for the flow of coolant to said second assembly while said second assembly is engaged, said regulating means further comprising an annular energy storing element coaxial with said assemblies and including a radially inner portion nearer to and a radially outer portion more distant from the common axis of said assemblies, and a ring abutting at least one of said radially inner and outer portions.

29. The apparatus of claim 28, wherein said energy storing element includes a diaphragm spring.

30. The apparatus of claim 28, wherein said at least one ring is a circumferentially complete ring.

31. The apparatus of claim 28, wherein said at least one ring is a split ring.

* * * * *